(12) United States Patent
Shrader

(10) Patent No.: US 6,639,582 B1
(45) Date of Patent: Oct. 28, 2003

(54) SYSTEM FOR COMBINING HAPTIC SENSORY-MOTOR EFFECTS FROM TWO SEPARATE INPUT DEVICES INTO RESULTANT SENSORY-MOTOR EFFECTS AND FOR FEEDBACK OF SUCH RESULTANT EFFECTS BETWEEN THE INPUT DEVICES

(75) Inventor: Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 09/637,318

(22) Filed: Aug. 10, 2000

(51) Int. Cl.$^7$ .................................................. G09G 5/00
(52) U.S. Cl. ...................................... 345/156; 345/173
(58) Field of Search ................................ 345/156, 157, 345/158, 161, 163, 168, 173; 434/113, 114, 112; 463/36, 37, 38, 40; 600/552, 553, 554

(56) References Cited

U.S. PATENT DOCUMENTS

| | | | |
|---|---|---|---|
| 5,165,897 A | 11/1992 | Johnson | 434/113 |
| 5,429,140 A | 7/1995 | Burdea et al. | 128/774 |
| 5,709,219 A | 1/1998 | Chen et al. | 128/782 |
| 5,974,262 A | 10/1999 | Fuller et al. | 395/838 |
| 5,984,880 A | 11/1999 | Lander et al. | 600/595 |

OTHER PUBLICATIONS

*IBM Technical Disclosure Bulletin*, "Tactile Glove for Virtual Reality Systems", vol. 39, No. 1, Jan. 1996, p. 43.

*Primary Examiner*—Chanh Nguyen
(74) *Attorney, Agent, or Firm*—Jerry B. Kraft; Jeffrey S. LaBaw

(57) ABSTRACT

The combination of haptic sensory-motor effects developed at two or more networked remote locations as well as the feedback between such remote locations of the effects resultant from such combinations. Within a communications network comprising a plurality of interconnected computer controlled terminals, a system for communicating haptic sensory-motor states which comprises, within a local or first network terminal, apparatus for receiving data representing an original haptic sensory-motor effect transmitted from a second or remote terminal, apparatus for converting the received data into the physical haptic sensory-motor effect represented by the data, and apparatus for juxtaposing upon the physical haptic sensory-motor effect, a direct physical haptic sensory-motor effect to thereby produce a combined resultant haptic sensory-motor effect at the local or first terminal.

7 Claims, 5 Drawing Sheets

SYSTEM FOR COMBINING HAPTIC SENSORY-MOTOR EFFECTS FROM TWO SEPARATE INPUT DEVICES INTO RESULTANT SENSORY-MOTOR EFFECTS AND FOR FEEDBACK OF SUCH RESULTANT EFFECTS BETWEEN THE INPUT DEVICES

TECHNICAL FIELD

The present invention relates to user interactive computer controlled systems for communicating haptic or tactile sensory-motor effects between network connected input/output devices.

BACKGROUND OF RELATED ART

The past decade has been marked by a technological revolution driven by the convergence of the data processing industry with the consumer electronics industry. This advance has been even further accelerated by the great advances made in the communications technologies which now enable the rapid transmission of vast quantities of data at speed rates that were inconceivable just a few years back. The result has been immense consumer and business involvement in communications, i.e. Internet driven enterprises and technologies.

In order to take fuller advantage of such resources and technologies, there is a need to make computer directed activities accessible to a substantial portion of the population which, up to a few years ago, was computer-illiterate or, at best, computer indifferent. Because of the capability of the computer to make all technological and professional functions more efficient and quicker, workers skilled in various technologies and professions, but of relatively low computer skills, must perform functions with the computer which only a few years back required skilled computer operators and technicians. Some of these functions may involve robotics and even robotic functions performed through a correlated combination of user inputs. As a result, the computer industry is applying a substantial resources into making the human-computer interfaces more friendly and comfortable for the user. Innovations are being explored in input/output devices. One significant area of such exploration is computer controlled time-varying recording and transmission of the effects of tactile sense organs such as the skin on the user's fingers, hand, or other parts of the body. This has given rise to a rudimentary generation of haptic devices which are based upon such sensory motor effects. Thus far such haptic devices have provoked the greatest interest in computer games, remote surgery and to a lesser extent in the flying and driving of vehicles.

In the computer game field, haptic devices are used to create tactile sensory-motor effects in virtual reality functions and devices; U.S. Pat. No. 5,984,880, Lander et al.is an example of such a virtual reality application. U.S. Pat. No. 5,429,140, Burdea et al. and U.S. Pat. No. 5,165,897, Johnson are examples of medical applications of haptic sensory-motor effects. Haptic sensory-motor effects have been transmitted over communication networks, e.g., U.S. Pat. No. 5,984,880 or U.S. Pat. No. 5,974,262, Fuller et al..

While haptic sensory-motor effects have been physically applied in a local environment or sensed and transmitted to be physically applied at remote location, little has been done in combining haptic effects from a plurality of remote locations as well as physically applying the haptic sensory-motor effects resulting from such remote combinations.

SUMMARY OF THE PRESENT INVENTION

The present invention provides for combination of haptic sensory-motor effects developed at two or more networked remote locations as well as for the feedback between such remote locations of the effects resultant from such combinations. Thus, the present invention is operative within a communications network comprising a plurality of interconnected computer controlled terminals. The invention provides a system for communicating haptic sensory-motor states which comprises, within a local or first network terminal, the means for receiving data representing an original haptic sensory-motor effect transmitted from a second or remote terminal, for converting said received data into the physical haptic sensory-motor effect represented by said data, and for juxtaposing a direct manual physical haptic sensory-motor effect upon said physical haptic sensory-motor effect. The invention, thus produces a combined resultant haptic sensory-motor effect at the local or first terminal.

The system of the present invention provides for feedback of the resultant or combined haptic sensory-motor effect back to the second or remote terminal and then visa-versa from the second or remote terminal back to the first or local terminal. In order to implement such a mutual feedback arrangement, the first terminal further includes means for transmitting data representing said resultant first terminal haptic sensory-motor effect back to said second terminal. The second terminal further includes means for converting said data representing said resultant first terminal haptic sensory-motor effect into the actual physical haptic sensory-motor effect, and means for juxtaposing upon said actual physical haptic sensory-motor effect, a direct physical haptic sensory-motor effect represented by original haptic sensory-motor effect data. This produces at said second terminal, a resultant second terminal physical haptic sensory-motor effect concurrent with the resultant first terminal effect.

The means in the first terminal for converting the received data into the physical haptic sensory-motor effect may be conveniently implemented in a matrix of moveable rods, together with user interactive means for touching said rods, and means for selectively driving rods in said matrix against said touching means. Likewise, the means in the first terminal for juxtaposing the direct physical haptic sensory-motor effect may be implemented by means enabling said user interactive means for touching said rods to selectively apply forces to rods in said matrix in opposition to said means for driving said rods.

With a similar rod matrix arrangement in the second terminal, the means for converting the data representing the resultant first terminal haptic sensory-motor effect into the actual physical haptic sensory-motor effect may be implemented as a matrix of moveable rods, in combination with user interactive means for touching said rods, and means for selectively driving rods in said matrix against said touching means. Likewise, the means in the second terminal for juxtaposing upon the actual physical haptic sensory-motor effect, a direct physical haptic sensory-motor effect may be implemented by enabling said user interactive means for touching to selectively apply forces to rods in said matrix in opposition to said means for driving said rods.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
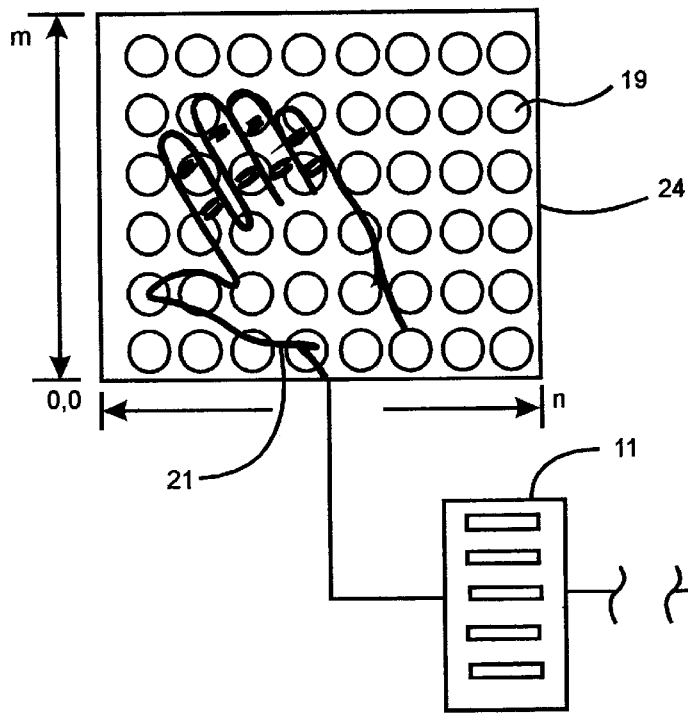
FIG. 1 is a block diagram of a generalized communication network system for transmitting and combining haptic sensory motor effects at a pair of terminals remote from each other with feedback between terminals.
Figure 1:
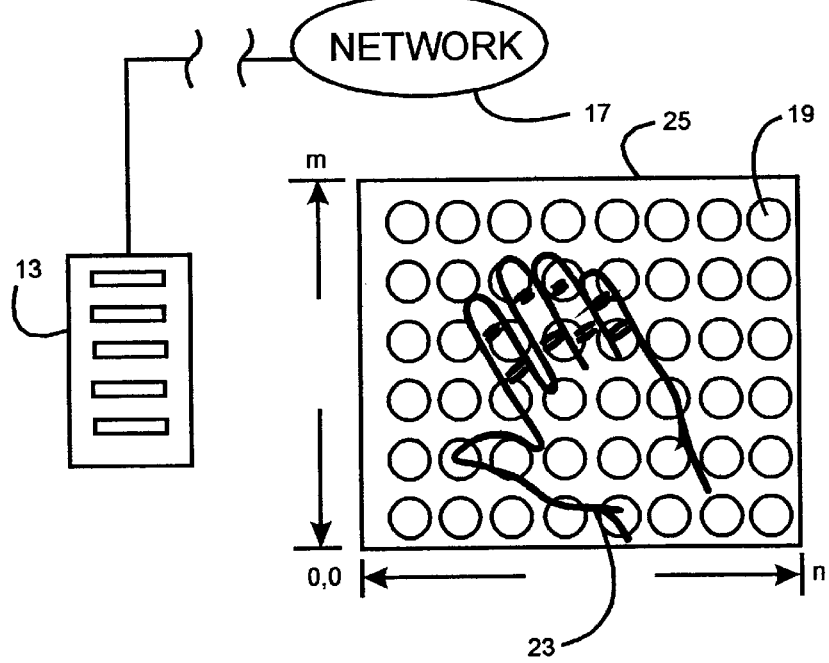

Referring to FIG. 1, the invention may be embodied through a pair of touch pads 24 and 25, respectively under the control of computers 11 and 13, and connected via these computers though the World Wide Web or Internet 17 (these terms are used synonymously although not quite the same). Each of the touchpads 23, 25 which will hereinafter be described in greater detail comprises a matrix:

X[0 . . . n] of Rod Data

Y[0 . . . m] of Rod Data

The rod data is determined at each X,Y position in the matrix through the relative extension lengths of rods 19 relative to substrates 21, 23 in boards 24, 25.

Figure 2:
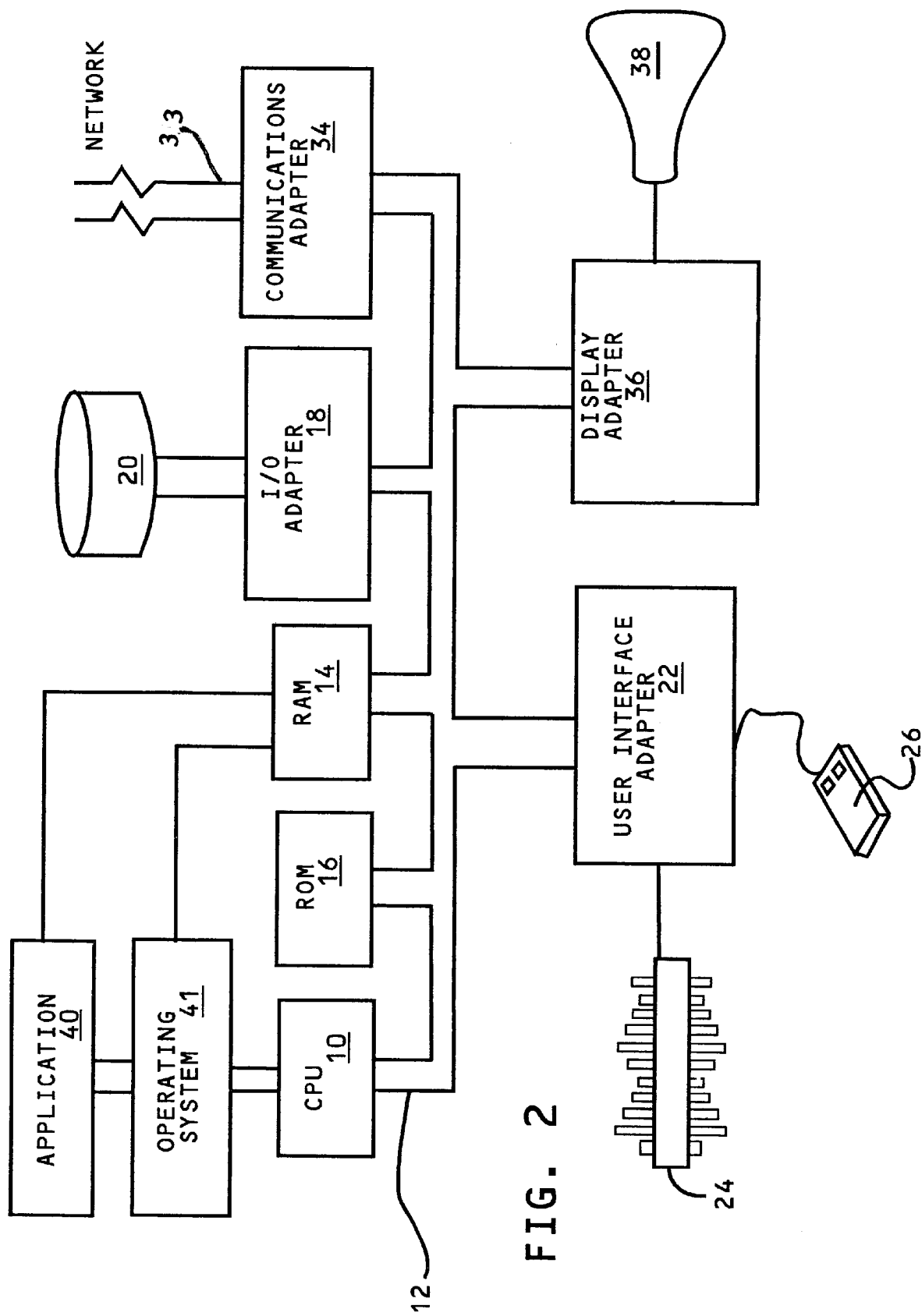
FIG. 2 is a block diagram of a generalized data processing system which will provide the computer support for the sensing and transmission of the haptic effects at each of the two terminal of FIG. 1.

In FIG. 2, a typical data processing system is shown which may function as a basic computer for controlling the sensing of the haptic sensory-motor effects at each of the remotely networked touchpads, e.g., touchpad 24 which connected through interface 22 and bus 12 to CPU 10. A 20 central processing unit (CPU) 10, such as one of the PC microprocessors or workstations, e.g. RISC System/6000™ (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of International Business Machines Corporation); Microsoft's Windows 98™ or Windows NT™, (Windows 98 and Windows NT are trademarks of Microsoft Corporation), as well as other UNIX and AIX operating systems. Application programs 40 controlled by the system are moved into and out of the main memory, random access memory (RAM) 14. These application programs will control the sensing of the haptic sensory-motor effects and the transmission and feedback between touchpads in the remotely networked terminals in accordance with the present invention. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside network via bus 33 enabling the data processing system to communicate with other such systems over a LAN or WAN, which includes, of course, the Web or Internet. I/O devices such as mouse 26 are also connected to system bus 12 via user interface adapter 22 and display 38 is connected via adapter 36.

Figure 4:
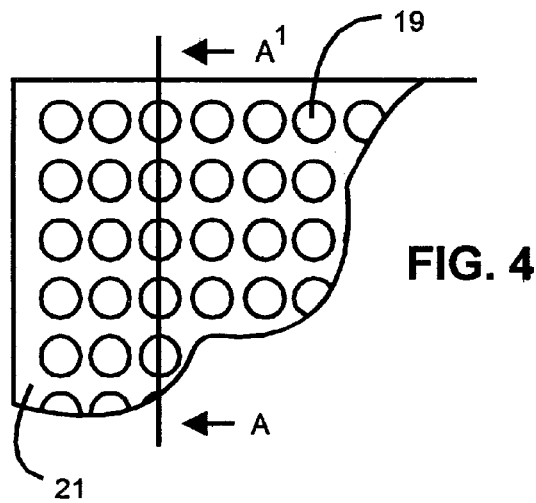
FIG. 4 is a plan view of a section of a touchboard like that in FIG. 3 which may be used in the implementation of the present invention.
Figure 3:
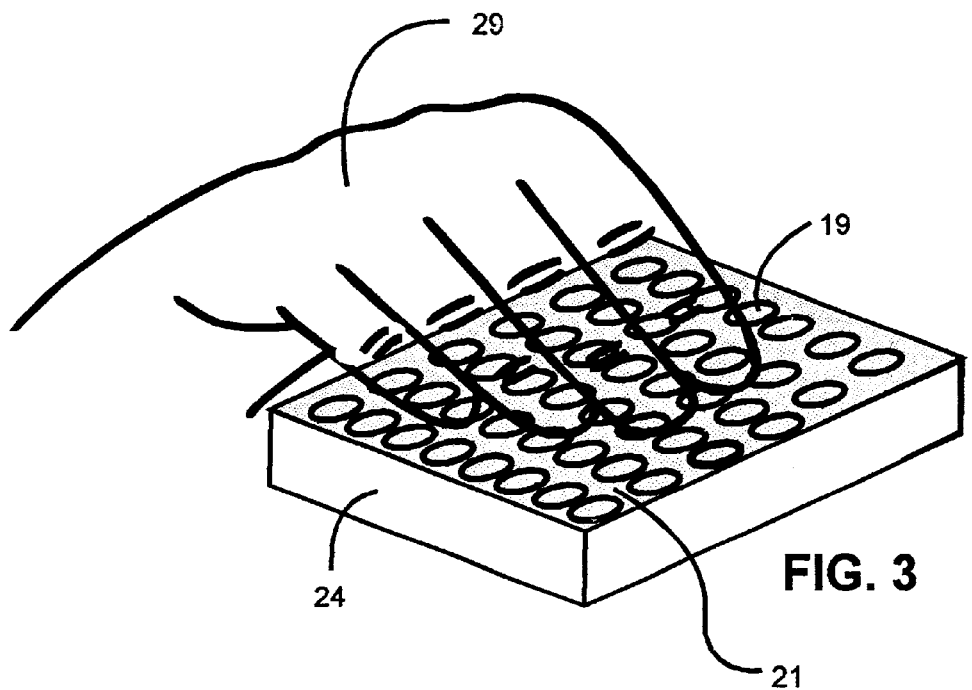
FIG. 3 is a simplified sketch of touchboard or pad which could be used for user I/O for the haptic sensory-motor effects.
Figure 5:
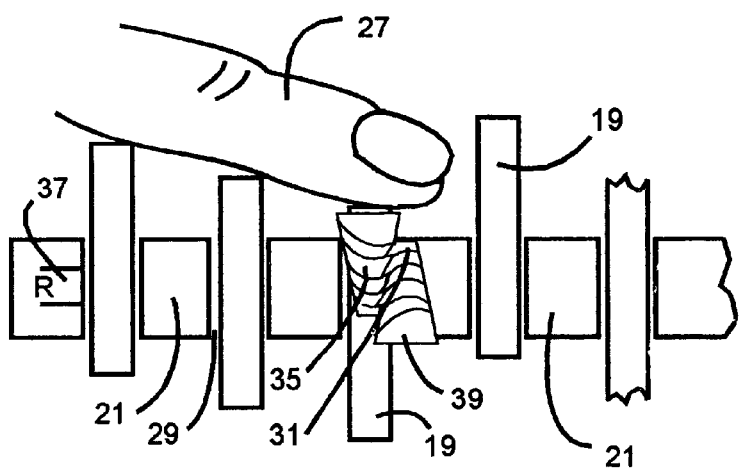
FIG. 5 is a section along line A–A' in FIG. 4.

While the haptic or tactile sensory-motor effects may be monitored or sensed as well as applied by a variety of existing implements, the present invention may be illustrated using a touchboard or touchpad of a matrix of rods 19 which are movable within a substrate or board 21 by touch via a finger 27 or hand 29 as shown in FIGS. 3 through 5. The finger or hand is used to physically input the haptic forces while the haptic forces or effects transmitted or feedback from the other haptic terminal are applied via the computer controlling the respective touchboard through an individual small motor associated with each rod in the touchboard matrix. The individual motors which are computer controlled are built into the touchboard substrate. For convenience in illustration, a portion of only one of these motors is shown in FIG. 5. The motor drives shaft 39 which rotates driving gear 31 to drive gear 35 on its respective rod 19 to move the rod linearly up and down. This imparts a haptic sensory-motor effect against finger 27 which in turn is imparting a linear sensory motor force in opposition to the motor driven effect. The result is sensed by the finger or hand, and the resultant positions of the rods in the matrix are sensed through position encoders 37. There is one such encoder for each rod in the matrix but only one is shown for convenience in illustration. The encoder output for each rod is stored, and the haptic sensory-motor effect produced by the collective rods in the matrix is transmitted at an appropriate sampling time back to the other terminal touchboard as will be subsequently described with respect to FIGS. 6 and 7.

It should be noted that the embodiment presented in FIGS. 3 to 5 is an illustrative embodiment and that other known means for sensing and applying haptic sensory-motor effects may also be used. The key to the present invention is not the sensory-motor effect but rather the feedback to produce concurrent resultant sensory-motor effects at least two remote terminals through the combination of the haptic inputs at each terminal. Also, the system could include a plurality of touch pads at one terminal matched with a corresponding plurality of touchpads at the other terminal.

The touchboard or touchpad may be more extensive than just the expanse of a finger or hand. It may cover greater and other body portions. The touch board may be mounted horizontally, vertically or at angles. Also the substrate or board need not be flat; it may be contoured, and the relative rod base positions would track such contours. Each of the two remote terminals could comprise several corresponding touchpads. Applications could involve the haptic effect of hand to hand forces, with each hand in each of the two terminals. This would be of interest in computer games, for example.

Also, in remote surgical applications, the probing or cutting haptic effect applied from one terminal, and the force in opposition could the haptic sensory-motor response of the-targeted body organ to the probe. In this connection, it is not necessary for the two touchpads involved in the feedback transmission to be of the same size. As long as the touchpads have same number of haptic sensory-motor points, i.e. the matrices have corresponding layouts proportional to each other, and the movements and drives of the individual elements in the matrix are also proportional to each other. Thus, in remote micro-surgical applications, an intrusive probe could have a miniature sensory-motor array to haptically probe body organs, the haptic sensory-motor feedback from such organs could be processed through a corresponding larger touchpad array at the "macro" surgeon's terminal.

Figure 6:
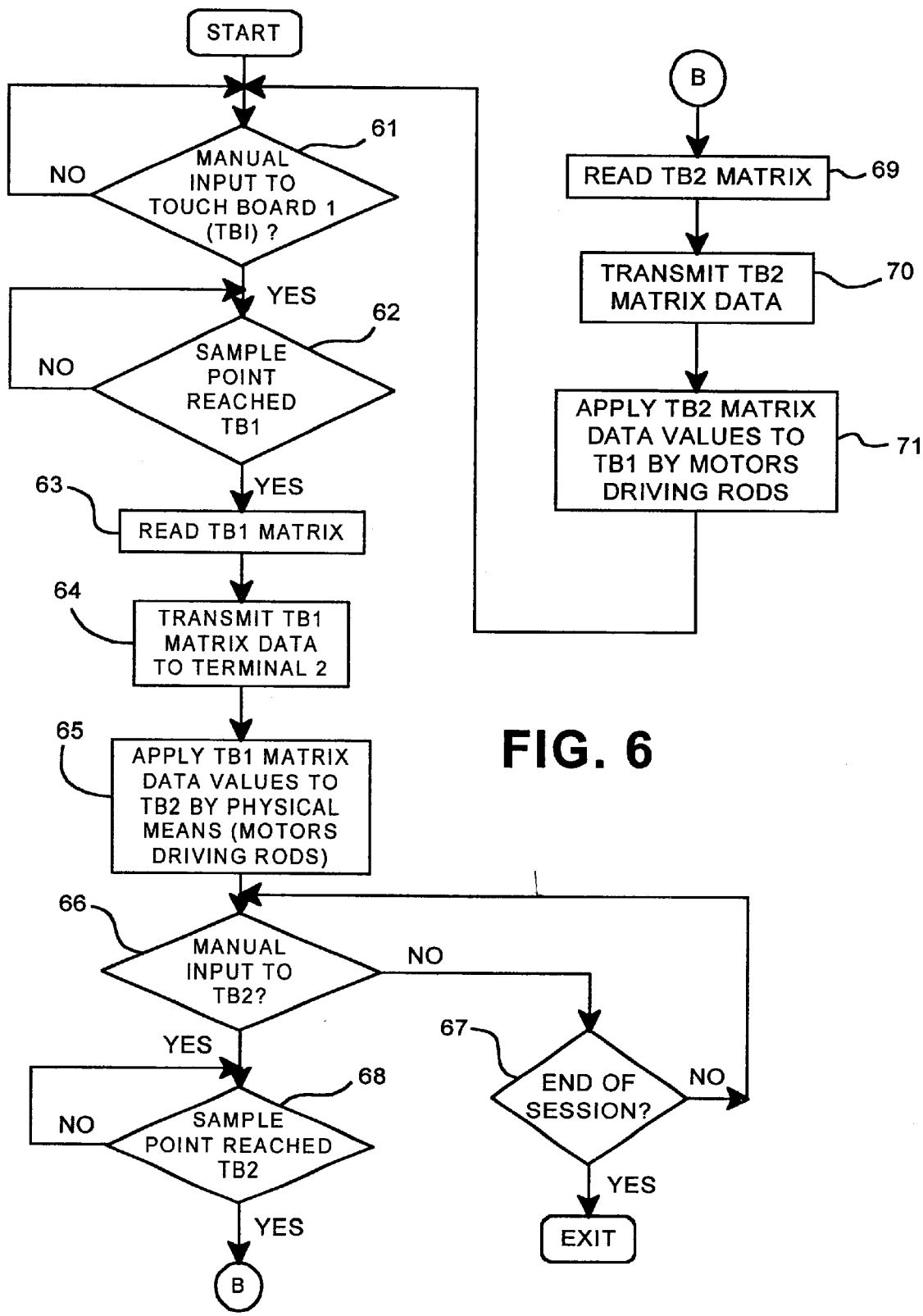
FIG. 6 is a generalized flowchart of the process according to the present invention for sensing haptic sensory-motor effects and for transmitting combining such effects between two remote network terminals.

A flowchart of a generalized application of the invention to any system having two remote, but network linked touchboards will now be described with respect to FIG. 6. When the session is started, it is assumed that there has already been a haptic sensory-motor input via motor drives to the first touchboard, TB1 from the second or remote touchboard, TB2. First, a determination is made, step 61 as to whether the user at TB1 has made an manual input. If No, then nothing is done, and the manual input is awaited. If Yes, there has been a manual input, then step 62, a further determination is made as to whether a periodic sampling point for TB1 has been reached. If No, the sampling point is awaited. If Yes, a sampling point has been reached, then the values in the TB1 matrix are read, step 63, and the values transmitted, step 64, as data to the second or remote terminal, and these TB1 data values are physically applied to the corresponding touchboard TB2 at the remote terminal, step 65. At this point, a determination is made, step 66 as to whether the user at TB2 has made an manual input. If No, then a determination is made, step 67, as to whether the session is at an end. If Yes, the session is exited. If No, the process is returned to step 66, and the manual input is awaited. If Yes, in step 66, there has been a manual input, then step 68, a further determination is made as to whether a periodic sampling point for TB2 has been reached. If No, the sampling point is awaited. If Yes, a sampling point has been reached, then the process proceeds via branch "B" to step 69 where the values in the TB2 matrix are read, and the values transmitted, step 70, as data feedback to the first terminal, and these TB2 data values are physically applied to the corresponding touchboard TB1 at the first terminal, step 71, after which another manual input in response to this motor driven input is awaited, decision block 61. The process then proceeds again as described above.

Since feedback readings transmitted between terminals over networks such the Internet, there a possibility that any one of the feedback reading may be delayed, e.g., because of different route through the network, so that it arrived after a subsequent feedback of data arrives at the destination terminal. Such a problem may be handled by noting the sampling cycle iteration time of each feedback pulse, and ignoring any feedback of data having a time iteration prior to the last feedback.

Figure 7:
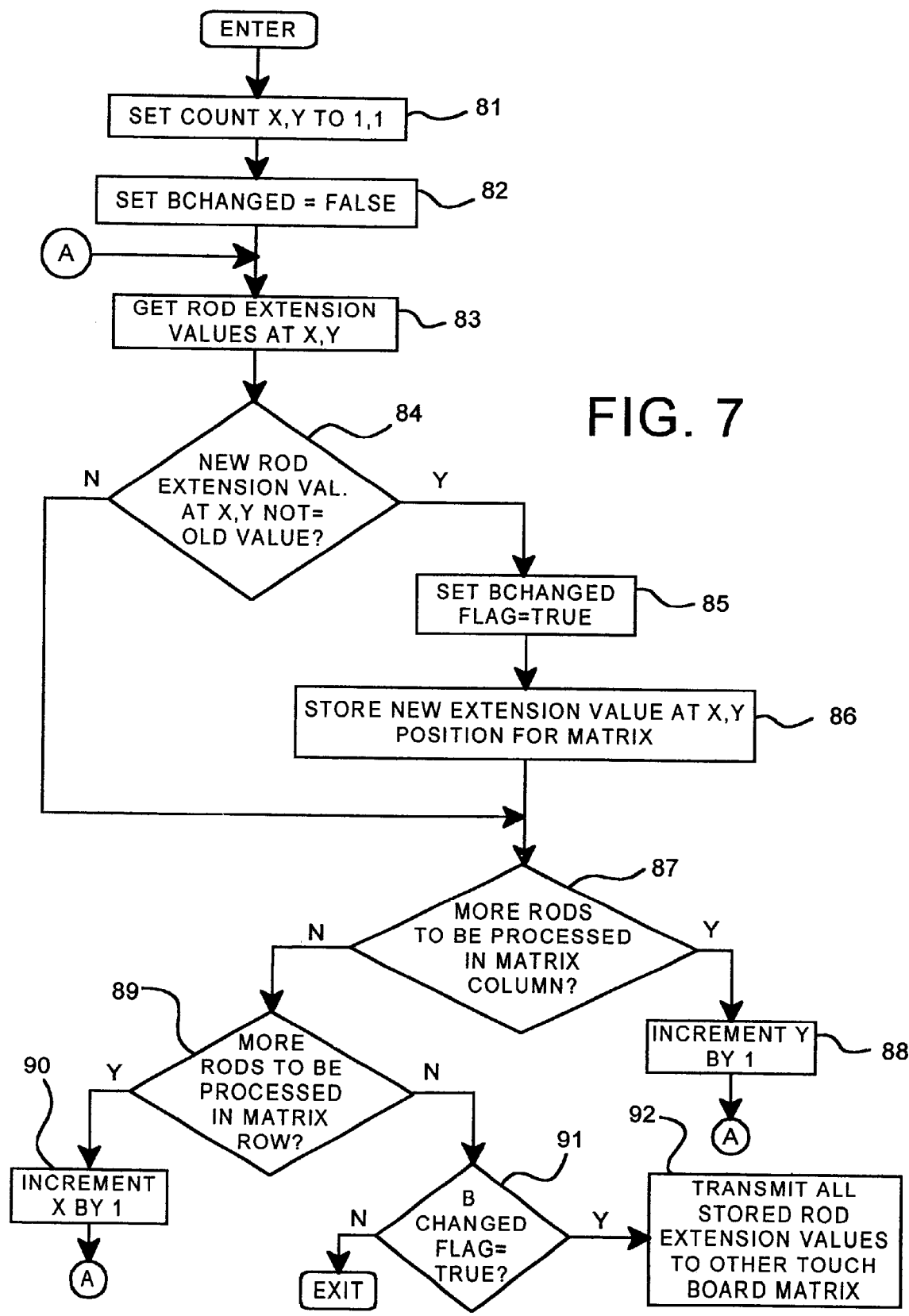
FIG. 7 is a simplified flowchart of how the haptic sensory-motor effects are measured through a touchboard embodiment which may be used at each terminal.

Referring to FIG. 7, there will be described how the rod displacement or extension values for the touchboard matrix of rods. The X,Y position values are obtained by first setting the position to 1,1, step 81. Initially, the change flag, "BChanged" for this initial position is set as equals False, step 82. The rod extension for the 1,1 rod is gotten, step 83, after which, a determination is made, step 84, as to whether the value gotten is not the old value. If Yes, the value is not the old value i.e., a new value, the BChanged flag is set to equal True, step 85. A new extension value is stored at X,Y (1,1) for the rod, step 86, and the process moves to decision step 87. Also, if the decision from step 84 had been No, i.e., old value remains, no change, then the process proceeded to step 87 where a determination is made as to whether there are more rods to be processed in the matrix column. If, Yes, then the Y count or position is incremented by "1", step 88, and process is branched via "A" back to step 83 and continued as described above. If the decision from step 87 is No, then the process proceeds to step 89 where a determination is made as to whether there are more rods to be processed in the matrix row. If Yes, then the X count or position is incremented by "1", step 90, and process is branched via "A" back to step 83 and continued as described above. If the decision from step 89 is No, then the process proceeds to step 91 where a determination is made as to whether the BChanged Flag has been changed to equal true. If Yes, then there has been changes in the matrix rod extension and displacement values, and the values are transmitted, step 92, to the other matrix or remote touchboard matrix, either TB1 or TB2 of FIG. 6 as appropriate. On the other hand if the determination from decision,step 91 is No, there has been no change as indicated by the BChange flag equals False, then there is no need to transmit, and the session may be exited.

One of the preferred implementations of the present invention is an application program 40. Until required by the computer system, the program instructions may be stored in another readable medium, e.g., in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communications network comprising a plurality of interconnected computer controlled terminals, a system for communicating haptic sensory-motor states comprising:
   a first terminal including:
      means for receiving data representing an original spatially arrayed haptic sensory-motor effect transmitted from a second terminal,
      means for converting said received data into the spatially arrayed physical haptic sensory-motor effect represented by said data,
      means for juxtaposing upon said spatially arrayed physical haptic sensory-motor effect, a direct corresponding spatially arrayed physical haptic sensory-motor effect to thereby produce a resultant first terminal spatially arrayed haptic sensory-motor effect, and
      means for transmitting data representing said resultant first terminal spatially arrayed haptic sensory-motor effect back to said second terminal, and
   said second terminal includes:
      means for converting said data representing said resultant first terminal spatially arrayed haptic sensory-motor effect into the actual spatially arrayed physical haptic sensory-motor effect, and
      means for juxtaposing upon said actual spatially arrayed physical haptic sensory-motor effect, a direct corresponding spatially arrayed physical haptic sensory-motor effect represented by original spatially arrayed haptic sensory-motor effect data, to thereby produce at said second terminal, a resultant second terminal spatially arrayed physical haptic sensory-motor effect concurrent with the resultant first terminal spatially arrayed haptic sensory-motor effect.

2. The communications network of claim 1, wherein said means in said first terminal for converting said received data into the spatially arrayed physical haptic sensory-motor effect comprises:

a matrix of moveable rods, user interactive means for touching said rods, and means for selectively driving rods in said matrix against said touching means.

3. The communications network of claim 2, wherein said means in said first terminal for juxtaposing said corresponding spatially arrayed direct physical haptic sensory-motor effect comprises:

means enabling said user interactive means for touching said rods to selectively apply forces to rods in said matrix in opposition to said means for driving said rods.

4. The communications network of claim 3, wherein said means in said second terminal for converting said data representing said resultant first terminal spatially arrayed haptic sensory-motor effect into the actual spatially arrayed physical haptic sensory-motor effect comprises:

a matrix of moveable rods, user interactive means for touching said rods, and means for selectively driving rods in said matrix against said touching means.

5. The communications network of claim 4 wherein said means in said second terminal for juxtaposing upon said actual spatially arrayed physical haptic sensory-motor effect, a spatially arrayed direct physical haptic sensory-motor effect comprises:

means enabling said user interactive means for touching to selectively apply forces to rods in said matrix in opposition to said means for driving said rods.

6. A method for communicating haptic sensory-motor states in a communications network comprising a plurality of interconnected computer controlled terminals comprising:

receiving at a first terminal, data representing an original spatially arrayed haptic sensory-motor effect transmitted from a second terminal, converting said received data into the spatially arrayed physical haptic sensory-motor effect represented by said data, juxtaposing upon said spatially arrayed physical haptic sensory-motor effect, a spatially arrayed direct physical haptic sensory-motor effect to thereby produce a resultant first terminal spatially arrayed haptic sensory-motor effect, and transmitting from said first terminal, data representing said resultant first terminal spatially arrayed haptic sensory-motor effect back to said second terminal, converting at second terminal, said data representing said resultant first terminal spatially arrayed haptic sensory-motor effect into the actual spatially arrayed physical haptic sensory-motor effect, and juxtaposing upon said actual spatially arrayed physical haptic sensory-motor effect at said second terminal, a spatially arrayed direct physical haptic sensory-motor effect represented by original spatially arrayed haptic sensory-motor effect data, to thereby produce at said second terminal, a resultant second terminal spatially arrayed physical haptic sensory-motor effect concurrent with the resultant first terminal spatially arrayed haptic sensory-motor effect.

7. A computer program having code recorded on a computer readable medium for communicating haptic sensory-motor states between two terminals in a communications network comprising a plurality of interconnected computer controlled terminals comprising:

means at a first terminal for receiving data representing an original spatially arrayed haptic sensory-motor effect transmitted from a second terminal, means for converting said received data into the spatially arrayed physical haptic sensory-motor effect represented by said data, means for juxtaposing upon said spatially arrayed physical haptic sensory-motor effect, a spatially arrayed direct physical haptic sensory-motor effect to thereby produce a resultant first terminal spatially arrayed haptic sensory-motor effect, and means at said first terminal for transmitting data representing said resultant first terminal spatially arrayed haptic sensory-motor effect back to said second terminal, means at said second terminal for converting said data representing said resultant first terminal spatially arrayed haptic sensory-motor effect into the actual spatially arrayed physical haptic sensory-motor affect, and means at said second terminal for juxtaposing upon said actual spatially arrayed physical haptic sensory-motor effect, a spatially arrayed direct physical haptic sensory-motor effect represented by original spatially arrayed haptic sensory-motor effect data, to thereby produce at said second terminal, a resultant second terminal spatially arrayed physical haptic sensory-motor effect concurrent with the resultant first terminal spatially arrayed haptic sensory-motor effect.

* * * * *